May 20, 1930.  E. W. BRANDT  1,759,390
SUPPORT FOR PHIALS, FLASKS, BOTTLES, AND LIKE CONTAINERS
Filed June 5, 1928   3 Sheets-Sheet 1
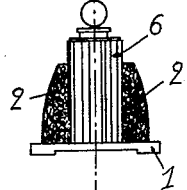
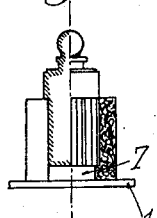
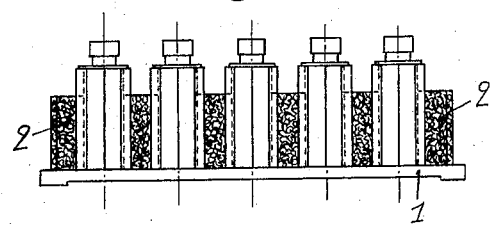
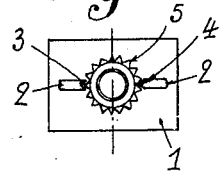
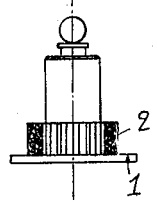
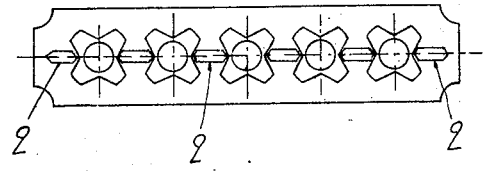
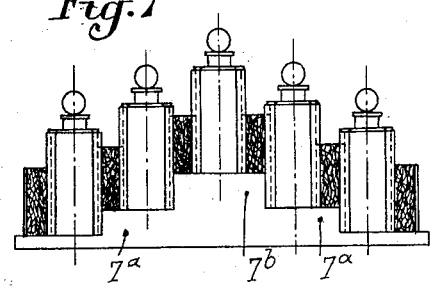
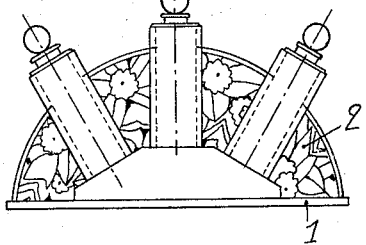
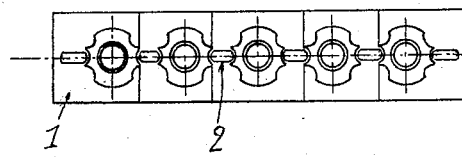
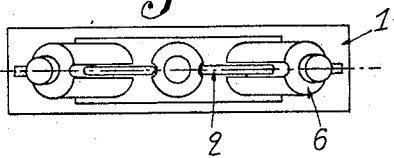
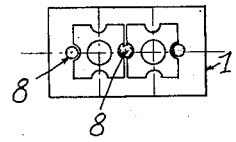
E. W. Brandt
INVENTOR
By: Marks & Clerk
ATTYS.

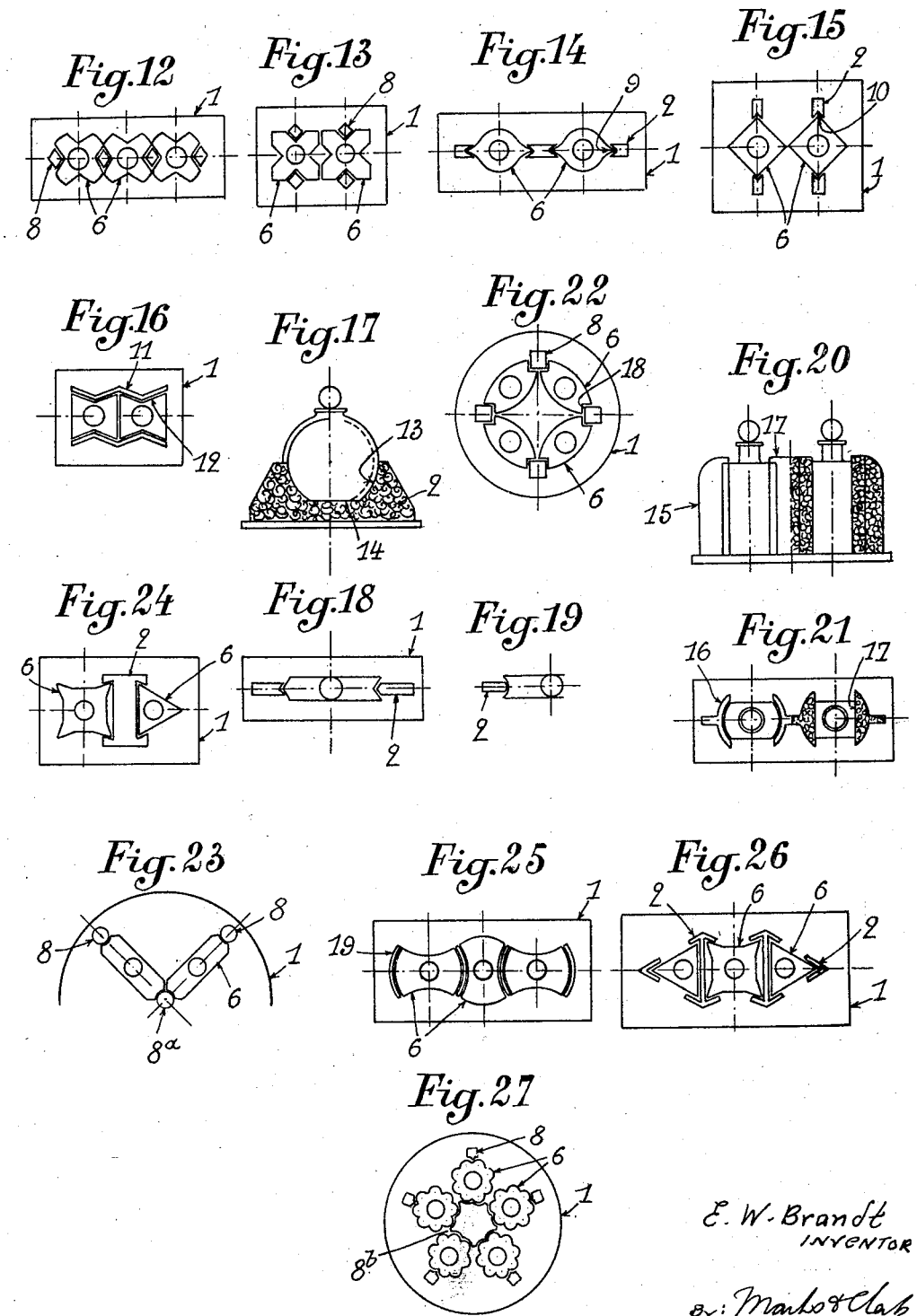

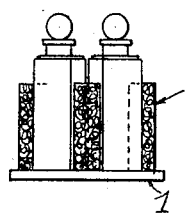
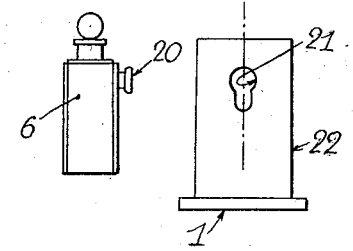
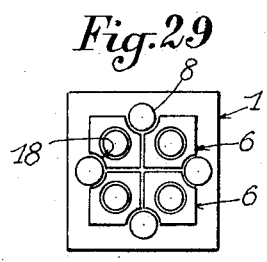
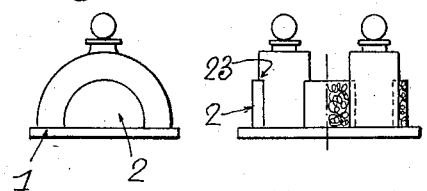
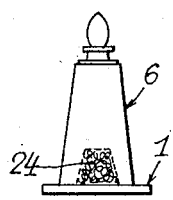
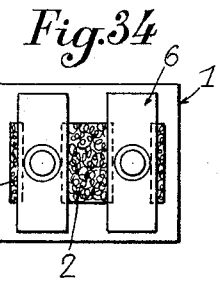
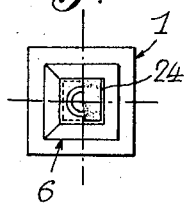
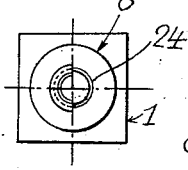
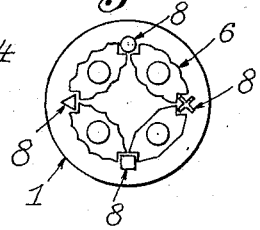

Patented May 20, 1930

1,759,390

UNITED STATES PATENT OFFICE

EDGAR WILLIAM BRANDT, OF PARIS, FRANCE

SUPPORT FOR PHIALS, FLASKS, BOTTLES, AND LIKE CONTAINERS

Application filed June 5, 1928, Serial No. 283,046, and in France June 11, 1927.

The present invention relates to improvements in phials or flasks and more particularly in the de luxe flasks used in perfumery and to the supports which are used for display purposes or both for display and packing purposes.

According to the invention, the shape of the flask and the shape of the support are so designed and combined, as to obtain the proper guiding of the phial upon the support as well as a good stability while permitting the ready location and removal of the flask. For this purpose, the flask and the support respectively comprise male and female parts which are adapted to cooperate with each other, the support and flask forming a unit so that the flask can only be mounted on a determined support which latter may only be used with a flask of determined shape. Furthermore, the support may be so designed as to leave completely or almost completely exposed the main faces of the flask, the latter completely concealing the line of contact between the support and the flask, which is important for a satisfactory display. Moreover, several flasks may be mounted on the same support, either in a single plane or in a staggered or stepwise disposition or in a fan-like disposition, the whole thus forming a complete unit or set.

In any case, the disposition according to the invention allows replacing to advantage the caskets heretofore used for packing and displaying flasks.

Further features of the invention will be set forth in the following description, with reference to the appended drawing, which shows, only by way of example, a number of embodiments of the invention.

In these drawings:

Figs. 1 and 2 show in elevation and in plan view respectively a first embodiment of the invention.

Figs. 3 and 4 refer to modifications of same.

Figs. 5 to 10 illustrate supports adapted to receive several flasks.

Figs. 11 to 16 are plan views illustrating various arrangements of phials and guiding elements according to the invention.

Figs. 17 to 19 show constructions more adapted to flasks of circular shape.

Figs. 20 and 21 illustrate, in elevation and plan view respectively, a support for two phials with locking means according to the invention.

Figs. 22 to 29 give various combinations of shapes for the containers and for the corresponding guiding elements.

Figs. 30 and 31 illustrate particular locking means.

Figs. 32 to 34 give other particular shapes of containers.

Figs. 35 to 37 show embodiments of the invention, wherein the assembling and eventually the locking elements are located under the container.

Fig. 38 is a plan view of a support according to the invention adapted to receive containers of different types.

The support shown in Figs. 1 and 2 comprises a base 1 and two vertical wings, standards, or guiding members 2 which may have any desired shape. The inner edges of said wings either form a groove or recess 3 or a thin edge 5 while the surface of the flask 6 is made with flutings 5; as clearly indicated in the drawings, these flutings, or the grooves comprised between said flutings, are adapted to cooperate with the groove 3 or the edge 4 of the support, whereby the flask is held in place on the base in a very stable manner.

For inserting the flask on the support the same is shifted vertically between the wings of the support and the removal is effected by a reverse movement. The wings, which are comparatively thin, will only conceal a very small portion of the flask and substantially the whole surface thereof will remain apparent, while the joint line is fully concealed, so that the whole unit gives the appearance of a solid panel or other background with the flask displayed in front thereof.

Fig. 3 shows a support which further comprises an auxiliary base piece 7 on which the flask is adapted to rest while the flutings are provided along a portion only of the height of the flask.

In Fig. 4, the flask has flutings on a small portion only of its height.

In the different types of supports illustrated in Figs. 5 to 10, the support is adapted to receive a plurality of flasks and the wings between the aligned flasks still form a kind of vertical wall or background, with the several flasks displayed in front thereof.

In Figs. 5 and 6, the number of flutings of the flasks is less than in Figs. 1 to 4 and said flutings are much thicker, the horizontal section of the flasks having a general cross shape.

In Figs. 7 and 8, the base is formed with various steps 7ª, 7ᵇ, whereby the flasks disposed thereon assume a staggered disposition; each flask has two diametrically opposite grooves which cooperate with the wings of the support, the exposed parts of the flasks being given any desired shape. In Figs. 9 and 10, the shape of the support is such that the flasks afford a fan-like disposition.

In Figs. 11 and 12, the wings are replaced by small columns or upright rods 8, disposed in a common vertical plane and whose cross-section corresponds to that of the grooves of two adjacent flasks, the shape of said cross-section being as desired. As shown in Fig. 13, the columns or other vertical guides may be also disposed at the corners of a polygon; they may also be arranged in a circle or an ellipse or any other suitable curve, in accordance to the number of flasks and to the desired appearance.

Obviously, the male parts of the interfitting portions may be provided on the flasks while the female parts are provided on the support. For example, in Fig. 14, each flask is provided with two ribs 9 engaging grooves provided at the edges of the support wings. In Fig. 15, the male parts are constituted by the vertical edges 10 of the flask itself and engage grooves of the wings or small columns of the support. In Fig. 16, the support comprises two vertical guiding members 11 having inwardly projecting parts 12 fitting within lateral recesses of the flasks. These guiding members surround more completely the flasks and afford a more positive guiding thereof; this type of support is suitable for obtaining particular ornamental effects which depend upon the ornamentation of the vertical members 11.

If the general shape of the flask does not comprise straight vertical edges or generatrices, the guiding members should be curved to conform with the shape of the flask. For example, if the flask has a circular outline in elevation, as shown in Figs. 17, 18 and 19, the wings 2 are curved at 13 to correspond with the flasks. Said wings may be connected together by a part 14 forming the base.

In the various embodiments above described, each flask may be removed from its support by a single vertical movement. In order to still increase the stability of the flask, locking means may be devised which, beside the vertical movement, will necessitate a lateral movement or a rotation for placing or removing the flask.

For example, as shown in Figs. 20 and 21, the support comprises vertical guides 15 having a cylindrical portion 16, while the flask has corresponding cylindrical faces and two opposite parallel plane faces, the distance between said faces being less than the free space between the guides. The guides are provided at the upper part with inner flanges 17 adapted to prevent the removal of the flask by a vertical shifting. In order to remove the flask, the latter must be turned through ninety degrees and is then removed by a lateral movement.

In Fig. 22, the small columns 8 of the support are disposed at the corners of a square and the flasks have two opposite faces whose cross-sections have the shape of a quarter of a circle; when the flasks 6, which are four in number, are in place and held by the columns engaged in grooves 18, along the edges of the flasks, the whole set has the general aspect of a cylinder.

In Fig. 23 the columns 8 are arranged circularly about a central column 8ª, whereby the flasks 6 are disposed radially.

Figs. 24 and 26 show further embodiments of the invention in which the dihedral angle formed by vertical edges of the flask is less than 90°, said edges engaging grooves in the support which have a dovetail cross-section.

Fig. 25 shows a disposition in which the flasks comprise four cylindrical faces, viz: two concave and two convex faces, while the support is provided with mating curved guides 19; the guides which are common to adjacent flasks engage at one side a convex face of a flask, and at the opposite side a concave face of another flask, so that the flasks are disposed at right angles to each other.

Fig. 27 shows an arrangement similar to that of Fig. 23, but herein the flasks are fluted. The central column 8ᵇ is also provided with flutings adapted to cooperate with the flutings of the flasks.

Figs. 28 and 29 illustrate a disposition similar to Fig. 22, wherein the flasks are prismatic, so that the whole set assumes a cubic shape.

In the disposition shown in Figs. 30 and 31 the assembling is completed by locking means constituted by a knob 20 provided on the flask and engaging an eyelet 21 provided on a vertical wing of a stand 23 of the support.

In Figs. 32 and 34, the faces of the flasks are provided with recessed portions which cooperate with the wings 2 of the support and the shoulders 23 thus formed are adapted to rest on the upper edge of the wings which thus form a seat for the flask. This arrangement affords a very good stability.

In the following modifications, the interfitting parts of the flasks and support, are provided at the bottom of the flasks and on the base portion of the support.

For example, in Figs. 35 to 37, the support comprises a boss 24 engaging a recess of corresponding shape at the bottom of the flask. Said boss may have any desired shape and for example it may be spherical, cylindrical, conical, prismatical, pyramidal, etc. More particularly, said boss may have a screwthread cooperating with a screwthread provided on the inner surface of the recess of the flask. The assembly thus obtained is very sound, while the whole surface of the flask remains apparent, the guiding member being then completely concealed.

It will be noted that the dispositions above described are given only by way of example, and that numerous modifications may be made in the shape of the base or/and of the guiding members, of the flasks and of the male and female assembling parts, without departing from the scope of the invention.

The unit formed by the support and the flask or flasks may be covered with a cover for packing and shipping purposes.

Furthermore, a support according to the invention may be provided with guiding or assembling members of varying types and with flasks of different shapes. Fig. 38, for example, shows a support having four columns of different shape adapted to hold in place four flasks also of different shapes.

In all cases, the guiding members of the support should be so constructed and arranged as to prevent the use of flasks which were not especially designed to be used in connection with said support.

It will be understood that the different parts of the support: base, wings, small columns, etc. may be made of any suitable material, such as metal, wood, glass, or various compositions, etc. as well as the flask itself; the several parts of the same support may be made of the same material or of different materials. They may be provided with any suitable ornamentation, according to the material used: they may be cut out, engraved, sculptured, forged, stamped, pressed, etc. The wings may for example be constituted by solid members or constituted by foliages forming the male and female parts for the assembling with the flasks.

The invention also contemplates the display and packing of any other containers and articles, such as boxes, cases, sheaths, etc.

Having now described my invention, what I claim as new and desire to secure by Letters Patent is:

1. In combination with a support for phials and like containers comprising a base and guiding means for said containers secured on said base, a number of containers, interfitting male and female portions on said guiding means and said containers adapted to cooperate with each other for selectively receiving and maintaining said containers on said support.

2. In combination with a support for phials and like containers comprising a base and guiding means for said containers secured on said base, a number of containers, interfitting male and female portions on said guiding means and said containers adapted to cooperate with each other for selectively receiving and maintaining said containers on said support, the line of contact of said interfitting portions being located behind and hidden by the exposed side of the corresponding containers.

3. In combination with a support for phials and like containers comprising a base and guiding means for said containers secured on said base, a number of containers, interfitting male and female portions on said guiding means and said containers adapted to cooperate with each other for selectively receiving and detachably locking said containers on said support.

4. In combination with a support for phials and like containers comprising a base and a vertical wall, a number of containers, said vertical wall having deformed portions adapted to cooperate with mating portions on said containers for selectively receiving the latter, the exposed side of said containers concealing the edges of said wall deformations which engage said mating portions on said containers, whereby the whole gives the appearance of a continuous background with the containers displayed in front thereof.

In testimony whereof I have signed my name to this specification.

EDGAR WILLIAM BRANDT.